(12) United States Patent
Leonhardt

(10) Patent No.: US 6,318,767 B2
(45) Date of Patent: Nov. 20, 2001

(54) DISENGAGING MEANS FOR HOSE COUPLINGS

(75) Inventor: Duane Leonhardt, Quebec (CA)

(73) Assignee: Mercedes Textiles Limited, Quebec (CA)

( * ) Notice: Subject to any disclaimer, the term of this patent is extended or adjusted under 35 U.S.C. 154(b) by 0 days.

(21) Appl. No.: 09/725,724

(22) Filed: Nov. 30, 2000

Related U.S. Application Data

(63) Continuation of application No. 09/288,974, filed on Apr. 9, 1999, now abandoned, which is a continuation of application No. 08/971,731, filed on Nov. 17, 1997, now abandoned, which is a continuation of application No. 08/508,970, filed on Jul. 28, 1995, now abandoned.

(30) Foreign Application Priority Data

Jun. 26, 1995 (CA) .................................... 2152661

(51) Int. Cl.$^7$ ...................................... F16L 17/00
(52) U.S. Cl. .................. 285/360; 258/359; 258/376; 258/401
(58) Field of Search .................... 285/359, 360, 285/376, 401, 70, 73, 354

(56) References Cited

U.S. PATENT DOCUMENTS

| | | | |
|---|---|---|---|
| 977,472 | * | 12/1910 | Pilkington . |
| 1,527,772 | * | 2/1925 | Baird . |
| 1,550,773 | * | 8/1925 | Baird . |
| 1,836,716 | * | 12/1931 | Huthsing . |
| 1,898,617 | * | 2/1933 | Church . |
| 2,268,407 | * | 12/1941 | Krone et al. ............... 285/359 X |
| 2,322,168 | * | 6/1943 | Smith ....................... 285/359 X |
| 2,408,243 | * | 9/1946 | Vartanian .................. 285/360 X |
| 2,417,025 | * | 3/1947 | Volpin ....................... 285/359 X |
| 2,816,779 | * | 12/1957 | Jensen . |
| 3,995,889 | * | 12/1976 | Carr et al. ................. 285/360 X |
| 4,502,701 | * | 3/1985 | Treloar et al. . |
| 4,643,459 | * | 2/1987 | Carson . |
| 4,858,960 | * | 8/1989 | Pharaon . |

FOREIGN PATENT DOCUMENTS

| | | | |
|---|---|---|---|
| 509899 | * | 10/1992 | (EP) ..................... 285/359 |
| 136792 | * | 5/1880 | (FR) ..................... 285/359 |
| 883008 | * | 11/1961 | (GB) ..................... 285/73 |

* cited by examiner

*Primary Examiner*—Teri Pham Luu
(74) *Attorney, Agent, or Firm*—Birch, Stewart, Kolasch & Birch, LLP

(57) ABSTRACT

An end member is provided for attachment of both ends of a unit of quarter turn quick connect fire hose or an adapter for a quarter turn quick connect fire hose, the end member having a generally tubular shape defining an axial opening, an uninterrupted smooth outer surface, a planar sealing face surrounding said axial opening, a base, fastening means comprising cams having single ramps and lugs adapted to engage said cams, and a sealing gasket, said cams and lugs mounted on the outer surface of the end member proximate the planar sealing surface, said end member comprising an axial rearward extension of at least one lug on the outer surface of the end member extending toward the base of the end member, the axial rearward extension having a base, top and sides, the sides of tine axial rearward extension of the lug including a concave surface between the top and the base of the axial rearward extension, and said planar sealing surface being adapted to engage an identical planar sealing surface of a corresponding end member in sealing relationship upon coupling of said end members.

4 Claims, 1 Drawing Sheet

US 6,318,767 B2

DISENGAGING MEANS FOR HOSE COUPLINGS

CROSS-REFERENCE TO RELATED APPLICATIONS

This application is a continuation of application Ser. No. 09/288,974, filed Apr. 9, 1999, now abandoned, which is a continuation of application Ser. No. 08/971,731, filed Nov. 17, 1997, now abandoned, which is a continuation of application Ser. No. 08/508,970, filed Jul. 28, 1995, now abandoned .

This invention is in the field of hose couplings. More particularly the invention is in the field of identical end members for quarter turn quick connect couplings having cams and lugs in which the lugs and cams engage for quick coupling. The invention lies in an improvement in existing end members for quarter turn quick connect couplings to facilitate disengagement of the two identical end members which become jammed or stuck. The improvement resides in providing a rearward axially extending flange extending axially rearwardly from at least one lug. The rearward axially extending flange has side walls which include a concave surface for engagement by a standard wrench for disengaging coupling members from one another.

The couplings which are the subject of this invention are frequently used on high pressure hose used in the forest-fire fighting industry. The identical quarter turn quick connect members of the coupling found on the end of adjoining hoses enable a person to join two hoses by hand by placing the end members of adjoining hose face to face and turning one member through a quarter turn relative to the opposing member. In the past high pressure fire hose used threaded couplings but in many areas the use of threaded couplings has been replaced by quarter turn quick connect couplings. Some existing high pressure fire hose has been adapted to cam and lug turn coupling by threading an adapter on the threaded fire hose which adapter incorporates a cam and lug to create an end member on the fire hose adapted for quarter turn quick connect coupling.

While the end members of adjoining hose described above are very easy to join by hand applied torque, after the coupling has been subject to high pressure, heat or corrosion the couplings sometimes cannot be opened by hand. The lugs of existing quarter turn quick connect couplings were designed for engagement and disengagement by hand applied torque. The shape of present lugs on the end members of quarter turn quick connect couplings are difficult to engage with a wrench when hand disengagement is not possible. The difficulty of disengagement can create a problem when crews have to change hoses quickly in the field and are unable to disconnect adjoining hoses by hand. Furthermore crews sometimes strike the couplings against rocks in order to loosen one end member from another causing wear or damage to the end member or hose.

The problem with disconnecting quarter turn quick connect couplings which become too tight or corroded for opening by hand torque has been overcome by providing an axially rearwardly extending flange having side walls which include a concave surface. The axially rearwardly extended flange can be engaged by the standard wrench used by firefighters. The axially rearwardly extending flange having side walls which include a concave surface which provides a surface for the wrench to engage so that one member of the coupling can be torqued to disengage the members of the coupling when disengagement by hand is not possible.

In the Drawings

Figure 1:
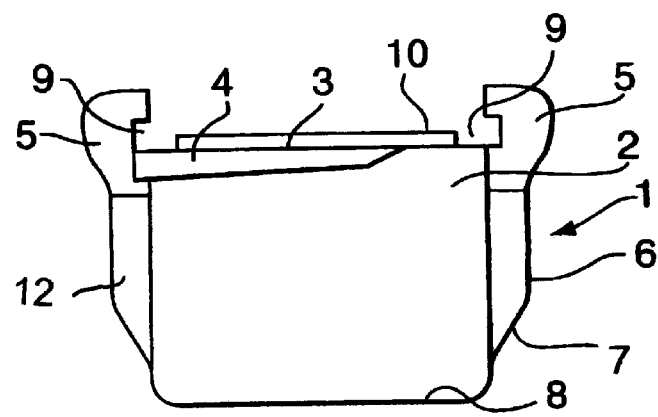
FIG. 1 is a side elevation view of an end member of the cam and lug coupling.

Referring to FIG. 1, a quarter turn quick connect end member 1 which is attached to both ends of a length of hose is shown. As seen in FIG. 1, the end member 1 has a generally cylindrical body 2 with a face 3 which is adapted to seat against the face 3 of an adjoining end member 1 not shown. Immediately above and behind the face is a cam 4 extending about three quarters of the distance between two lugs 5 disposed on either side of the end member 1 at 180° relative to one another. The lugs 5 extend forwardly of the face 3 of the end member 1 and as well extend axially rearwardly from the face 1 in the form of a flange 6. The flange 6 has side walls 12 which includes a concave surface 13 to be engaged and retained by a standard wrench when using a wrench to disengage one member 1 of a coupling from an identical member 1 of an adjoining coupling. The end of the flange 6 features an inclined surface 7 which inclines downwardly to join the surface of body 1 proximate the base 8 of the end member. The incline 7 is to prevent snagging the end member on wood, rocks or other obstacles. The top of the lug 5 includes slots 9.

Figure 2:
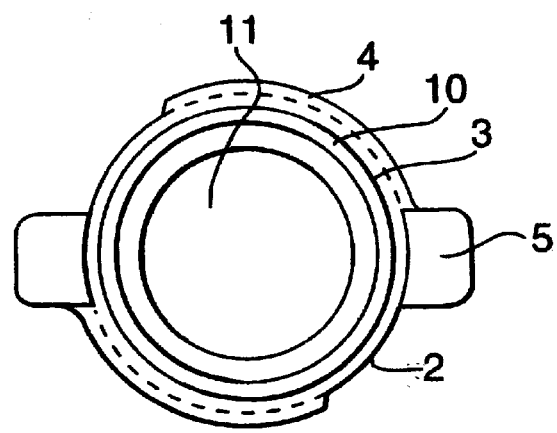
FIG. 2 is a top view of an end member of the cam and lug coupling.
Figure 3:
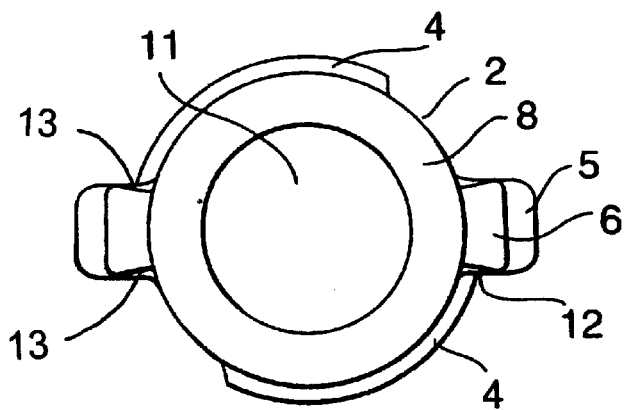
FIG. 3 is a bottom view of an end member of the cam and lug coupling.

Referring to FIG. 2 there is shown a face sealing gasket 10 extending over a portion of the face 3 of end member 1. There is a central aperture 11 extending through end member 1 and face sealing gasket 10. Referring to FIG. 3 the central aperture 11 is seen to extend through the member 1. The base 8 is tubular when viewed from the bottom.

The end members 1 each having a face sealing gasket 10 are placed face sealing gasket 10 to face sealing gasket 10. One or other or both of the end members are then turned by hand relative to one another so that slots 9 of cams 5 of respective end members engage the cams 5 of the opposite end member forming a leak-proof seal.

When adjoining end members 1 cannot be disconnected by hand, a standard wrench is applied to one end member in such a fashion that the end of the standard wrench engages the ridge 6 of one of the lugs 5 and torque is applied to one of the flanges 6 of one of the end members 1 while a foot or other means is used to prevent the end member 1 of the adjoining end member from moving.

The provision of a lug 5 having a flange 6 extending axially rearwardly from the face of the end member provides a flange readily accessible to a standard wrench. Once the standard wrench engages the flange 6, the wrench is turned to disengage adjoining end members with less wear, tear and damage to the fire hose, in less time and in some situations with greater safety than is currently the case.

While the description of the flange 6 has been directed to the axial rearward extension of the lug the flange may be disposed at other than immediately behind and below the lug. While the rearward extension of the flange is shown as extending axially rearwardly to the face of the end member the ridge may be substantially axial.

What is claimed is:

1. An end member for attachment of both ends of a unit of quarter turn quick connect fire hose or an adapter for a quarter turn quick connect fire hose, the end member having a generally tubular shape defining an axial opening, an uninterrupted smooth outer surface, a planar sealing face surrounding said axial opening, a base, fastening means comprising cams having single ramps and lugs adapted to engage said cams, and a sealing gasket, said cams and lugs mounted on the outer surface of the end member proximate the planar sealing surface, said end member including an axial rearward extension of at least one lug on the outer surface of the end member extending toward the base of the end member, the axial rearward extension having a base, top and sides, the sides of the axial rearward extension of the lug including a concave surface between the top and the base of the axial rearward extension, and said planar sealing surface being adapted to engage an identical planar sealing surface of a corresponding end member in sealing relationship upon coupling of said end members.

2. The end member for attachment to a quarter turn quick connect fire hose or an adapter for a quarter turn quick connect fire hose of claim 1 wherein said axial rearward extension inclines downwardly toward and terminates at said outer surface of said member.

3. The end member for attachment to a quarter turn quick connect fire hose or an adapter for a quarter turn quick connect fire hose of claim 2 in which the axial rearward extension extends rearwardly a sufficient distance to be engaged by a wrench.

4. The end member for attachment to a quarter turn quick connect fire hose or an adapter for a quarter turn quick connect fire hose of claim 2 in which an axial rearward extension of at least one lug extends axially rearwardly on the outer surface of the end member at least three-quarters of the distance from the engaging surface of the end member towards the base of the end member.

* * * * *